US012755443B2

(12) United States Patent
Rakshit et al.

(10) Patent No.: US 12,755,443 B2
(45) Date of Patent: Oct. 6, 2026

(54) REAL-TIME DYNAMIC VIDEO GENERATION BASED ON USER PREFERENCES

(71) Applicant: INTERNATIONAL BUSINESS MACHINES CORPORATION, Armonk, NY (US)

(72) Inventors: Sarbajit K. Rakshit, Kolkata (IN); Sathya Santhar, Ramapuram (IN); Sridevi Kannan, Katupakkam (IN)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 18/539,601

(22) Filed: Dec. 14, 2023

(65) Prior Publication Data

US 2025/0200822 A1 Jun. 19, 2025

(51) Int. Cl.
*G06T 11/00* (2026.01)
*G06F 40/40* (2020.01)
*H04L 9/00* (2022.01)
*H04L 67/306* (2022.01)

(52) U.S. Cl.
CPC .............. *G06T 11/00* (2013.01); *G06F 40/40* (2020.01); *H04L 9/50* (2022.05); *H04L 67/306* (2013.01)

(58) Field of Classification Search
CPC .......... G06T 11/00; G06T 11/20; G06T 11/60; G06T 11/80; G06T 13/00; G06T 13/40;
(Continued)

(56) References Cited

U.S. PATENT DOCUMENTS 11,973,608 B2 * 4/2024 Kare ........................ G06T 11/00
12,437,188 B2 * 10/2025 Cantrell ................ G06F 40/279
(Continued)

FOREIGN PATENT DOCUMENTS

JP 2021140228 9/2021

OTHER PUBLICATIONS

Mogaji et al., “Using AI to Personalise Emotionally Appealing Advertisement”, https://www.researchgate.net/publication/337197234_Using_AI_to_Personalise_Emotionally_Appealing_Advertisement, Accessed Nov. 29, 2023; 22 Pages.
(Continued)

*Primary Examiner* — Vijay Shankar
(74) *Attorney, Agent, or Firm* — Seed Intellectual Property Law Group LLP

(57) ABSTRACT

A computer-implemented method may include generating a first set of keywords based on a user’s stored preferences; prioritizing the first set of keywords into at least one subset of keywords; inputting the at least one subset of keywords into a bi-directional attention-based long short-term memory recurrent neural network; generating, by a bi-directional attention-based long short-term memory recurrent neural network, at least one story comprising story text based on the at least one subset of keywords; inputting story text from the at least one story into a video generative model conditioned with images of objects referred to by the at least one story; generating, by the video generative model, a video comprising at least one generated video frame; and verifying compliance of the at least one generated video frame with an embedded smart contract.

20 Claims, 8 Drawing Sheets

(58) Field of Classification Search
CPC ......... G06T 13/60; G06T 13/80; G06F 40/40; H04L 9/50; H04L 67/306
See application file for complete search history.

(56) References Cited

U.S. PATENT DOCUMENTS

| | | | | |
|---|---|---|---|---|
| 12,469,273 | B2 * | 11/2025 | Chemerys | G06T 11/00 |
| 2016/0379253 | A1 | 12/2016 | Chan et al. | |
| 2019/0392487 | A1 | 12/2019 | Duke | |
| 2020/0273062 | A1 | 8/2020 | Probell | |
| 2024/0355010 | A1 * | 10/2024 | Ahafonov | G06T 11/001 |
| 2024/0428470 | A1 * | 12/2024 | Dela Rosa | G06V 10/7715 |
| 2025/0148218 | A1 * | 5/2025 | Gusarov | G06T 19/006 |

OTHER PUBLICATIONS

Anderson, "Microsoft Proposes GODIVA, a Text-To-Video Machine Learning Framework", https://www.unite.ai/godiva-microsoft-research-asia-text-to-video-generation-image-synthesis/, Dec. 9, 2022; 6 Pages.

LeadingindiaAI, "Text to video generation for News Stories", https://www.leadingindia.ai/downloads/projects/VP/vp_16.pdf, Accessed Dec. 12, 2023; 3 Pages.

Li et al., "Video Generation From Text" https://arxiv.org/pdf/1710.00421.pdf, Oct. 1, 2017; 8 Pages.

IBM, "IBM Watson Advertising", https://web.archive.org/web/20230407085812/https://www.IBM.com/watson-advertising/thought-leadership/IBM-watson-advertising, Apr. 7, 2023; 5 Pages.

Bishop, "Dynamic Search Ads: What They Are & How to Use Them", https://www.semrush.com/blog/dynamic-search-ads/, Feb. 17, 2023; 22 Pages.

Bretous, "A Marketer's Quick Guide to Dynamic Ads", https://blog.hubspot.com/marketing/dynamic-ads, Jan. 11, 2022; 12 Pages.

Dynamic yields, "Dynamic Ads", https://www.dynamicyield.com/glossary/dynamic-ads/, Accessed Dec. 12, 2023; 3 Pages.

Shor, "Tfgan: A Lightweight Library for Generative Adversarial Networks", https://blog.research.google/2017/12/tfgan-lightweight-library-for.html, Dec. 12, 2017; 4 Pages.

* cited by examiner

REAL-TIME DYNAMIC VIDEO GENERATION BASED ON USER PREFERENCES

BACKGROUND

Aspects of the present invention relate generally to generating personalized messaging and dynamic video generation.

Personalized messaging and videos may provide improved communication relevance per user and increased return on investment for communication providers. Personalized messaging and videos may include content, promotions, and calls to action change based on a user's historical preferences and behavior.

SUMMARY

In a first aspect of the invention, there is a computer-implemented method including: generating a first set of keywords based on a user's stored preferences; prioritizing the first set of keywords into at least one subset of keywords; inputting the at least one subset of keywords into a bi-directional attention-based long short-term memory recurrent neural network; generating, by a bi-directional attention-based long short-term memory recurrent neural network, at least one story including story text based on the at least one subset of keywords; inputting story text from the at least one story into a video generative model conditioned with images of objects referred to by the at least one story; generating, by the video generative model, a video including at least one generated video frame; and verifying compliance of the at least one generated video frame with an embedded smart contract.

In another aspect of the invention, there is a computer program product including one or more computer readable storage media having program instructions collectively stored on the one or more computer readable storage media. The program instructions are executable to: generate a first set of keywords based on a user's stored preferences; prioritize the first set of keywords into at least one subset of keywords; input the at least one subset of keywords into a bi-directional attention-based long short-term memory recurrent neural network; generate at least one story including story text based on the at least one subset of keywords via a bi-directional attention-based long short-term memory recurrent neural network; input story text from the at least one story into a video generative model conditioned with images of objects referred to by the at least one story; and generate a video including at least one generated video frame via the video generative model.

In another aspect of the invention, there is a system including a processor set, one or more computer readable storage media, and program instructions collectively stored on the one or more computer readable storage media. The program instructions are executable to: generate a first set of keywords based on a user's stored preferences; prioritize the first set of keywords into at least one subset of keywords; input the at least one subset of keywords into a bi-directional attention-based long short-term memory recurrent neural network; generate at least one story including story text based on the at least one subset of keywords via a bi-directional attention-based long short-term memory recurrent neural network; input story text from the at least one story into a video generative model conditioned with images of objects referred to by the at least one story; and generate a video including at least one generated video frame via the video generative model.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
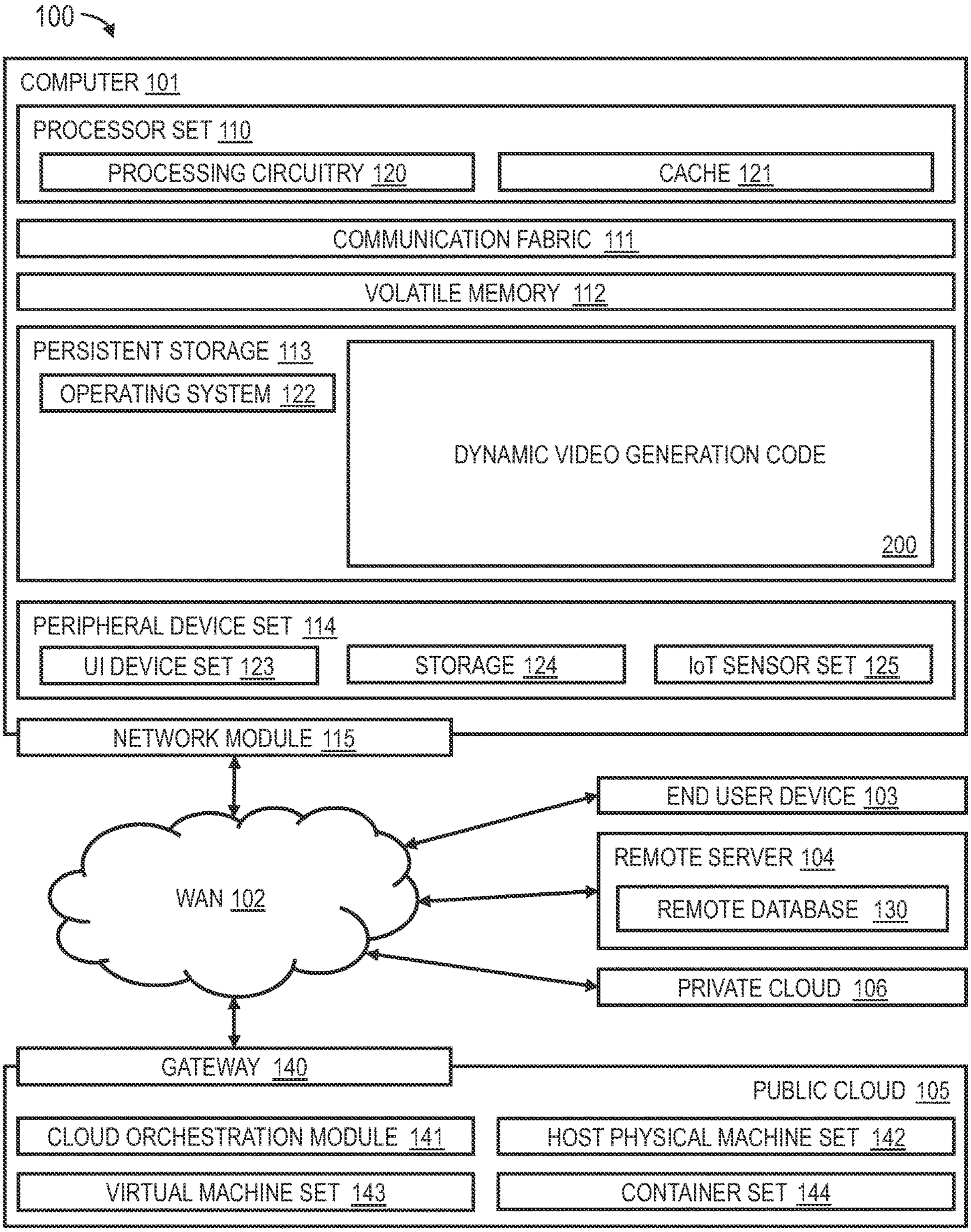
FIG. 1 depicts a computing environment according to an embodiment of the present invention.

Aspects of the present invention relate generally to systems and methods of real-time dynamic video generation and, more particularly, to real-time dynamic video generation based on user preferences.

According to aspects of the invention, a dynamic video generation system may include generating a first set of keywords based on a user's stored preferences with respect to interactions with brands, products, entities, or individuals. In embodiments, the set of keywords may be compiled over time based on user direct input or based on user data collected over time when interacting with brands, products, entities, or individuals. In embodiments, the set of keywords may be augmented by a second set of keywords, such as ad-provider-specific keywords, such as current events, featured products, and individuals in popular focus, to identify and augment overlap in user preferences and ad-provider videos. In embodiments, a first set of keywords may be augmented with a fixed set of ad-provider specific keywords for a fixed duration. High overlap in user preferences and ad-provider keywords may be compiled into a subset of keywords that may be dynamically updated over time.

It should be understood that to the extent implementations of the invention collect, store, or employ personal information provided by, or obtained from, individuals (for example, user product or brand preferences), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

In embodiments, the subset of identified keywords may be input to a bi-directional attention-based long short-term memory (bi-LSTM) recurrent neural network (RNN) or generative adversarial network (GAN). The bi-LSTM RNN may be utilized to generate at least one story-based text, including text based on the subset of keywords, by inferring relationships between words within the subset of keywords. Story-based text may be input into a video generative model conditioned with images of objects, people, places, and the like referred to by the text of the story to generate, frame-by-frame, a video. In embodiments, story-based text may be input into a video generative model that is a time and frequency domain-based GAN.

GANs offer an approach towards machine learning-based generative modeling using deep learning methods such as convolutional neural networks. GANs may be used to train generative models via two sub-models, including a generator model and a discriminator model. A generator model may be trained to generate new examples, and the discriminator model may be trained to classify the examples generated by the generator model as either real or generated. The generator model and discriminator model may be trained in an adversarial manner against one another until the discriminator model is unable to consistently identify examples that are real or generated. GAN models may be implemented as text-to-video models that receive natural language in the form of text as input and produce a video matching that description.

GANs alone are not ideal for generating dynamic videos, including text-to-video generation, in comparison to bi-LSTM RNN when used for text classification, speech recognition, forecasting models, and text-to-video generation. Bi-LSTM RNNs employ a first model learning a sequence of provided inputs and a second model learning the reverse sequence of provided inputs. In this way, bi-LSTM RNNs utilize the sequences of data and use data patterns to generate future predictions based on both past and future inputs.

Aspects of the present invention improve generating dynamic videos by including text-to-video generation based on keywords, objects, search history, demographic information, language preference, and individual user preferences rather than grouped user preferences or historical user data from large groups. Aspects of the present invention incorporate GANs and bi-LSTM RNNs in operative cooperation to generate dynamic, personalized videos. In this way, personalized messaging and videos may be created using machine learning-based generative modeling. In particular, traditional dynamic videos fail to incorporate real-time dynamically generated video and instead rely on static images, static text, or premade video.

Aspects of the present invention also improve dynamically generating video advertising by verifying compliance of generated videos with an embedded smart contract(s). Smart contracts may automate the actions required in an agreement or contract, such as verifying that brands, products, individuals, and entities depicted in generated frames are used with permission. Prior to displaying the generated video, the disclosed system may verify that each generated frame within a generated video complies with embedded smart contracts relating to brands, products, individuals, and entities to protect intellectual property, brands, products, individuals, or entities. Non-compliant frames may be flagged as such, and the system may re-generate the non-compliant frame to exclude the brand, product, individual, or entity that has not provided contractual agreement to be depicted in a video. In response to determining that all generated frames are smart contract compliant, the system may communicate or issue instructions to display the generated video, such as within a web browser or software application.

In embodiments, a computer-implemented method may include generating, by a processor set, a first set of keywords based on a user's stored preferences; prioritizing, by the processor set, the first set of keywords into at least one subset of keywords; inputting, by the processor set, the at least one subset of keywords into a bi-directional attention-based long short-term memory recurrent neural network; generating, by the processor set using the bi-directional attention-based long short-term memory recurrent neural network, at least one story including story text based on the at least one subset of keywords; inputting, by the processor set, story text from the at least one story into a video generative model conditioned with images of objects referred to by the at least one story; and generating, by the processor set using the video generative model, a video including at least one generated video frame. Aspects of the present invention improve the process of dynamic video generation based on keywords, objects, search history, demographic information, language preference, and individual user preferences rather than grouped user preferences or historical data from large groups.

In embodiments, the computer-implemented method may include verifying compliance of the at least one generated video frame with an embedded smart contract. Aspects of the present invention improve dynamically generating video by verifying compliance of generated videos with embedded smart contracts to prevent non-compliance.

In embodiments, the computer-implemented method may include verifying non-compliance of the at least one generated video frame with an embedded smart contract; identifying at least one first generated video frame including a generated object in non-compliance with the embedded smart contract; and replacing the at least one first generated video frame including a generated object in non-compliance with the embedded smart contract with at least one second generated video frame including a generated object in compliance with the embedded smart contract. Aspects of the present invention improve dynamically generating video by verifying compliance of generated videos with embedded smart contracts by re-generating non-compliant objects or video frames.

In embodiments, the computer-implemented method may include augmenting the first set of keywords with provider-specific keywords including augmenting the first set of key words with provider-specific keywords selected from a group consisting of current events, featured products, and individuals. Aspects of the present invention improve the process of dynamic video generation based on ad-provider specific keywords to generate video frames based on current events, featured products, and individuals.

In embodiments, the computer-implemented method may include augmenting the first set of keywords with provider-specific keywords including augmenting the first set of keywords with a fixed set of ad provider-specific keywords for a fixed duration. Aspects of the present invention improve the process of dynamic video generation based on ad-provider specific keywords during a fixed timeframe to generate video frames relevant to the timing of current events, featured products, and individuals.

In embodiments, the computer-implemented method may include generating at least one story-based text based on the at least one subset of keywords includes: inputting the at least one subset of keywords into the bi-directional attention-based long short-term memory recurrent neural network; and inferring relationships between words within the at least one subset of keywords. Aspects of the present invention improve the process of dynamic video generation based on relationships between related or unrelated keywords in order to improve relevancy of generated video frames.

In embodiments, the computer-implemented method may include generating at least one story-based text on the at least one subset of keywords includes conditioning the bi-directional attention-based long short-term memory recurrent neural network on factors selected from a group consisting of story length, word count, creativity level, or user emotion. Aspects of the present invention improve the process of dynamic video generation based on improved relevancy of story-based text based on user preferences relating to story length (including word count and duration), level of creativity, or user emotion.

In embodiments, the computer-implemented method may include a video generative model that is a time and frequency domain-based generative adversarial network. Aspects of the present invention improve the process of dynamic video generation based on training generative models via two sub-models, including a generator model and a discriminator model.

In embodiments, the computer-implemented method may include generating video frames via the video generative model includes generating video frames via a next-frame prediction GAN in operative cooperation with the video generative model. Aspects of the present invention improve the process of dynamic video generation by generating additional video frames based existing generated frames.

In embodiments, the computer-implemented method may include determining a similarity score between the first set of keywords based on a user's stored preferences and a second set of keywords based on a second user's stored preferences; determining that the similarity score is above a predefined threshold; modifying the video including the at least one generated video frame via an object replacement generative adversarial neural network; and generating a second video. Aspects of the present invention improve the process of dynamic video generation based on identifying similarities between user preferences to expedite the creation of videos similar to a first video.

In embodiments, a computer program product may include program instructions executable to generate a first set of keywords based on a user's stored preferences; prioritize the first set of keywords into at least one subset of keywords; input the at least one subset of keywords into a bi-directional attention-based long short-term memory recurrent neural network; generate at least one story including story text based on the at least one subset of keywords via a bi-directional attention-based long short-term memory recurrent neural network; input story text from the at least one story into a video generative model conditioned with images of objects referred to by the at least one story; and generate a video including at least one generated video frame via the video generative model. Aspects of the present invention improve the process of dynamic video generation based on keywords, objects, search history, demographic information, language preference, and individual user preferences rather than grouped user preferences or historical data from large groups.

In embodiments, a computer program product may include program instructions executable to verify compliance of the at least one generated video frame with an embedded smart contract. Aspects of the present invention improve dynamically generating video by verifying compliance of generated videos with embedded smart contracts to prevent non-compliance.

In embodiments, a computer program product may include program instructions executable to verifying non-compliance of the at least one generated video frame with an embedded smart contract; identifying at least one first generated video frame comprising a generated object in non-compliance with the embedded smart contract; and replacing the at least one first generated video frame comprising a generated object in non-compliance with the embedded smart contract with at least one second generated video frame comprising a generated object in compliance with the embedded smart contract. Aspects of the present invention improve dynamically generating video by verifying compliance of generated videos with embedded smart contracts by re-generating non-compliant objects or video frames.

In embodiments, a computer program product is disclosed including augmenting the first set of keywords with provider-specific keywords including augmenting the first set of key words with provider-specific keywords selected from a group consisting of current events, featured products, and individuals. Aspects of the present invention improve the process of dynamic video generation based on ad-provider specific keywords to generate video frames based on current events, featured products, and individuals.

In embodiments, a computer program product is disclosed including augmenting the first set of keywords with provider-specific keywords including augmenting the first set of keywords with a fixed set of ad provider-specific keywords for a fixed duration. Aspects of the present invention improve the process of dynamic video generation based on ad-provider specific keywords during a fixed timeframe to generate video frames relevant to the timing of current events, featured products, and individuals.

In embodiments, a computer program product wherein generating at least one story-based text based on the at least one subset of keywords includes: inputting the at least one subset of keywords into the bi-directional attention-based long short-term memory recurrent neural network; and inferring relationships between words within the at least one subset of keywords. Aspects of the present invention improve the process of dynamic video generation based on relationships between related or unrelated keywords in order to improve relevancy of generated video frames.

In embodiments, a computer program product is disclosed wherein generating at least one story-based text on the at least one subset of keywords includes conditioning the bi-directional attention-based long short-term memory recurrent neural network on factors selected from a group consisting of story length, word count, creativity level, or user emotion. Aspects of the present invention improve the process of dynamic video generation based on improved relevancy of story-based text based on user preferences relating to story length (including word count and duration), level of creativity, or user emotion.

In embodiments, a computer program product is disclosed wherein the video generative model is a time and frequency domain-based generative adversarial network. Aspects of the present invention improve the process of dynamic video generation based on training generative models via two sub-models, including a generator model and a discriminator model.

In embodiments, a computer program product is disclosed wherein generating video frames via the video generative model includes generating video frames via a next-frame prediction GAN in operative cooperation with the video generative model. Aspects of the present invention improve the process of dynamic video generation by generating additional video frames based existing generated frames.

In embodiments, a system may include a processor set, one or more computer readable storage media, and program instructions collectively stored on the one or more computer readable storage media, the program instructions executable to: generate a first set of keywords based on a user's stored preferences; input the at least one subset of keywords into a bi-directional attention-based long short-term memory recurrent neural network; generate at least one story including story text based on the at least one subset of keywords via a bi-directional attention-based long short-term memory recurrent neural network; input story text from the at least one story into a video generative model conditioned with images of objects referred to by the at least one story; and generate a video including at least one generated video frame via the video generative model. Aspects of the present invention improve the process of dynamic video generation based on keywords, objects, search history, demographic information, language preference, and individual user preferences rather than grouped user preferences or historical data from large groups.

Implementations of the invention are necessarily rooted in computer technology. For example, implementing bi-LSTM RNNs or GANs is inherently computer-based and cannot be performed in the human mind. Training and using an RNN or GAN is, by definition, performed by a computer and cannot practically be performed in the human mind (or with pen and paper) due to the complexity and massive amounts of calculations involved. For example, an artificial RNN may have millions or even billions of weights that represent connections between nodes in different layers of the model. Values of these weights are adjusted, e.g., via backpropagation or stochastic gradient descent, when training the model and are utilized in calculations when using the trained model to generate an output in real-time (or near real-time). Given this scale and complexity, it is simply not possible for the human mind, or for a person using pen and paper, to perform the number of calculations involved in training and/or using a machine learning model.

As a non-limiting example, in embodiments, the system may generate a video by receiving user preference data, such as preferred restaurants, preferred timing of user lunch or dinner, and preferred celebrities or personalities. User preference data may include keywords relating to preference data. A subset of keywords may be generated by identifying apparent relationships between keywords, such as "cheeseburger" and "dinner." The subset of keywords may also be generated by inferring relationships between keywords based on user interactions with keywords, timing of interactions with respect to keywords, keyword search history, or the like. For example, an inferred relationship between "cheeseburger" and a particular "celebrity" may be inferred based on the frequency a user searches for those terms close to one another. Keyword identification may also include identifying the most important keywords or phrases from the user's activity history, such as by analyzing the frequency of occurrence of each word or phrase and selecting the most common or relevant ones. Identified and inferred keywords can be further refined by removing duplicates, synonyms, and other irrelevant information.

A sequence model, such as a pre-attention bi-LSTM, including an encoder and decoder, may receive the subset of keywords to produce a fixed-length context vector via the encoder. The fixed-length context vector may be used by the decoder to generate a keyword input sequence.

The keyword input sequence may be used to generate story-based text via a sequence model, such as a bi-LSTM RNN, which allows the model to consider both the past and future context of the keyword input sequence. This is achieved by using two separate LSTM networks: one that reads the input sequence in forward order and another that reads it in reverse order. The outputs of both LSTM networks are concatenated to produce a final context vector.

An attention module within the sequence model may be configured to identify different parts of the input sequence at different time steps based on their relevance to the current output, i.e., the attention module allows the sequence model to dynamically select which portions of the input sequence to pay attention to, rather than relying solely on the fixed-length context vector produced by the encoder. The attention module may compute a set of attention weights for each time step of the input sequence. These weights indicate how much attention the model should pay to each time step when generating the output at the current time step. The attention weights are computed based on a combination of the current decoder state and the encoder outputs.

As a non-limiting example, output at each time step is a function of the current input and the previous hidden state. The hidden state at each time step is calculated using the following equations:

$$\text{i\_t} = \text{sigmoid}(\text{W\_i}[\text{x\_t}, \text{h\_}\{t-1\}] + \text{b\_i})$$

$$\text{f\_t} = \text{sigmoid}(\text{W\_f}[\text{x\_t}, \text{h\_}\{t-1\}] + \text{b\_f})$$

$$\text{g\_t} = \tanh(\text{W\_g}[\text{x\_t}, \text{h\_}\{t-1\}] + \text{b\_g})$$

$$\text{o\_t} = \text{sigmoid}(\text{W\_o}[\text{x\_t}, \text{h\_}\{t-1\}] + \text{b\_o})$$

$$\text{c\_t} = \text{f\_t} * \text{c\_}\{t-1\} + \text{i\_t} * \text{g\_t}$$

$$\text{h\_t} = \text{o\_t} * \tanh(\text{c\_t})$$

Where x_t is the input at time step t; h_{t−1} is the previous hidden state; c_{t−1} is the previous cell state; i_t, f_t, and o_t are the input, forget, and output gates; and g_t is the candidate cell state.

In a bi-LSTM with the disclosed attention module, a loss function considers the attention weights. One possible loss function for this model is the attention-based cross-entropy loss, which is defined as:

$$L = -1/N * \text{sum\_i}\hat{}N\ \text{sum\_j}\hat{}K\ \text{y\_}\{i, j\} * \log(\text{sum\_t}\hat{}T\ \text{alpha\_}\{i, j, t\} * \text{p\_}\{i, j, t\})$$

Where alpha_{i,j,t} is the attention weight assigned to the tth input token for the ith training example at the jth output time step p_{i,j,t} is the predicted probability of the tth token in the output sequence for the ith training example at the jth time step. Attention weights are learned during training and used to weight the input sequence based on its relevance to the current output time step. A weighted input sequence may be input into the bi-directional attention-based long short-term memory recurrent neural network, depicted in FIG. 4, configured to infer relationships between words within at least one subset of keywords to generate a story-based text as previously described. Conditioning of the bi-directional attention-based long short-term memory recurrent neural network may occur based on factors such as story length, word count, creativity level, or user emotion to further refine the story-based text.

The text-based story may be input into a video generative model, such as a time and frequency domain-based generative adversarial network, conditioned with images of objects referred to by the story, such as a text-filter conditioned GAN (TFGAN). A TFGAN model may be conditioned on story-based text description in addition to conditioning the TFGAN model based on contract mapping from advertising agencies, including information such as product names, brands, captions, or celebrities to be included in generated video frames such that a generated video is targeted to a particular entity, brand, or product.

The framework of the video generative model may have text description t passed to a text encoder T to generate a frame-level representation $t_f$ and a video-level representation $t_v$. Here, $t_f$ is a representation common to all frames, and contains frame-level information like background, objects, and the like from the text. The video representation $t_v$ extracts the temporal information such as actions, object motion, and the like. The text representation, along with a sequence of noise vectors $\{z_i\}$ where i=1 to l is passed to a recurrent neural network to produce a trajectory in the latent space. I denotes the number of frames in the video sequence. These sequences of latent vectors are then passed to a shared frame generator model G to produce the video sequence. The generated video is then fed to two discriminator models $D_F$ and $D_V$. $D_F$ is a frame-level discriminator that classifies if the individual frames in the video are real or fake, whereas the video discriminator $D_F$ is trained to classify the entire video as real or fake. The discriminator models $D_F$ and $D_V$ also take the text encoding $t_f$ and $t_v$ respectively as inputs to enforce text-conditioning. The discriminator model D and the generator model G are trained using an adversarial game. An optimization objective may be represented as:

$$L_{real} = \mathbb{E}_{(v,t)\sim p_{data,real}}\left[\log(D(v, T(t))) + \frac{\gamma}{2}\|\nabla D(v, t)\|^2\right]$$

$$L_{fake} = \frac{1}{2}\left[\mathbb{E}_{(v,t)\sim p_{data,fake}}\log(1 - D(v, T(t))) + \mathbb{E}_{z\sim p_Z}\log(1 - D(G(z, T(t)), T(t)))\right]$$

$$\min_G \max_D L_{real} + L_{fake}$$

The text encoder $T$ is optimized as follows $$\max_T L_T = \mathbb{E}_{(v,t)\sim p_{data,real}}\log(D(v, T(t))) + \mathbb{E}_{(v,t)\sim p_{data,fake}}\log(1 - D(v, T(t)))$$

Where $p_{data,real}$ denotes the real data distribution with correct video-text correspondences and where denotes the distribution with incorrect video-text correspondences. Both $L_{real}$ and $L_{fake}$ are repeated for both $D_F$ and $D_V$.

To ensure that generated videos comply with legal and ethical requirements, the system may analyze and classify generated frames to track ethical and legal compliance. Generated videos from the GAN network pass through a smart contract and a compliance module that tracks the content of the video frames and checks on various parameters to ensure that there is no adult content, no ethical violation, and no other legal breaches based on the video owner's and publisher's agreements. The compliance module may analyze generated frames and return Boolean values as true if the video frames are compliant or false if otherwise. The smart contract requires the compliance module to return true for the video to be displayed to a user at the appropriate time and location. If it returns false, an appropriate error message is communicated to the video publisher, indicating the violation so that the updated contract detail is again fed back to TFGAN to regenerate the video or video frames.

In this manner, implementations of the invention may generate a plurality of bi-LSTM RNN generated video frames compiled into a personalized video based on user preferences and which are incorporated into the real-time dynamically generated video.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as dynamic video generation code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
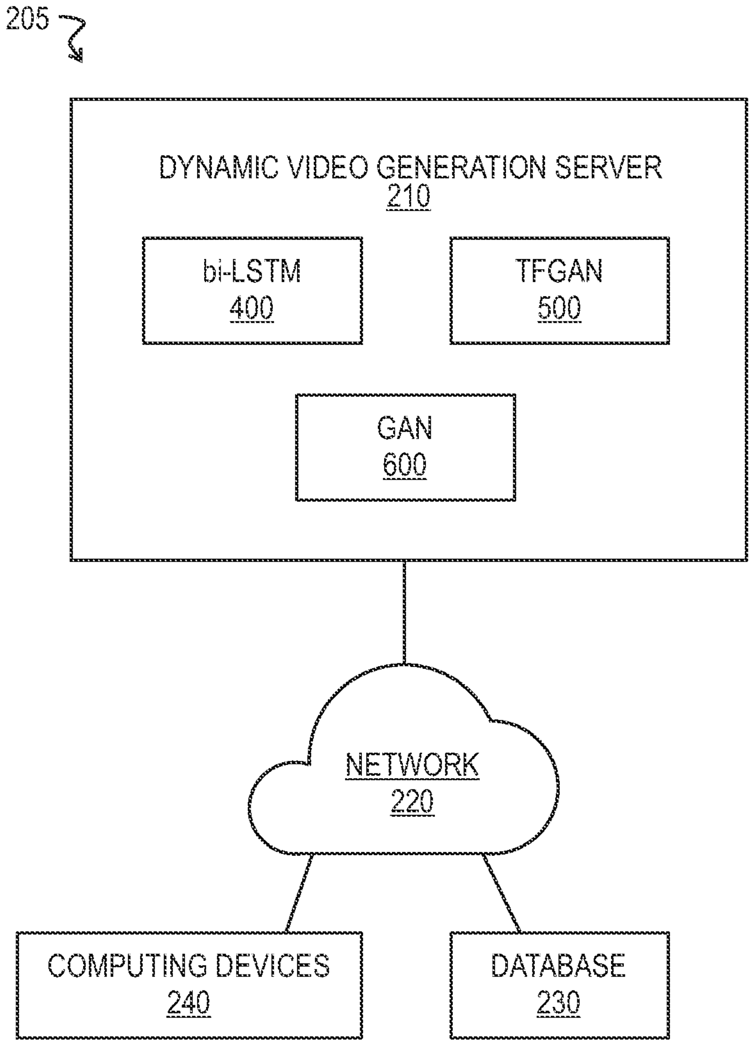
FIG. 2 shows a block diagram of an exemplary environment in accordance with aspects of the present invention.

FIG. 2 shows a block diagram of an exemplary environment 205 in accordance with aspects of the invention. In embodiments, the environment includes a dynamic video generation server 210 including or in communication with bi-LSTM 400 with attention layer, TFGAN 500, and object replacement GAN 600, corresponding to the computer 101 and dynamic video generating code of block 200, as in FIG. 1. The dynamic video generation server 210 may be configured for generating subsets of keywords to form a story-based text via the bi-LSTM 400; generating a plurality of video frames via the TFGAN 500; and ensuring compliance of the plurality of video frames with smart contracts or user preferences via the object replacement GAN 600. Generated video frames may make up a video communicated to a plurality of different user computer devices 240, such as EUD 103 of FIG. 1, simultaneously. The environment 205 includes at least one database 230 in operable communication with the dynamic video generation server 210 over network 220, corresponding to WAN 102 of FIG. 1. The database 230, corresponding to remote server 104 or remote database 130 of FIG. 1, may be a database corresponding to historical user preference databases 304*a*, 304*b* or user preference database 306 of FIG. 3A, or text-to-video mapping database 504 of FIG. 5.

In embodiments, the dynamic video generation server 210 of FIG. 2 includes bi-LSTM 400 with attention layer, TFGAN 500, and object replacement GAN 600, each of which may include modules of block 200 of FIG. 1. Such modules may include routines, programs, objects, components, logic, data structures, and so on that perform particular tasks or implement particular data types that block 200 uses to carry out the functions and/or methodologies of embodiments of the invention as described herein. Bi-LSTM 400 with attention layer, TFGAN 500, and object replacement GAN 600, each of which may include modules of block 200, are executable by the processing circuitry 120 of FIG. 1 to perform the inventive methods as described herein. The dynamic video generation server 210 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

Figure 3A:
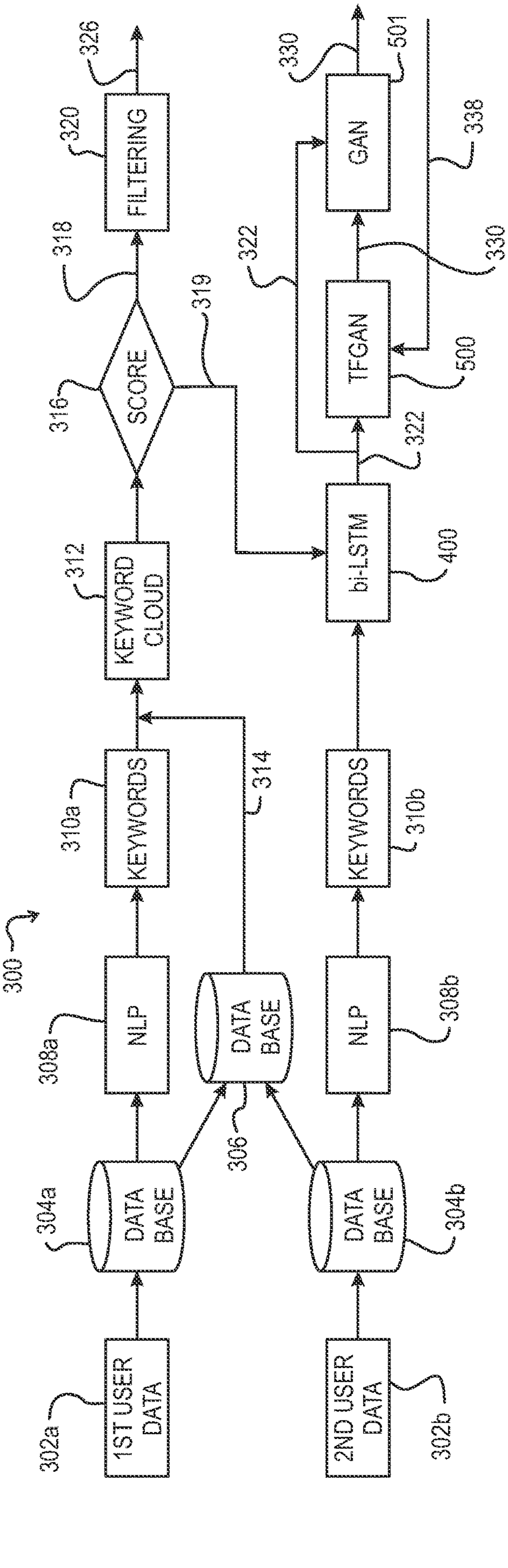
FIG. 3A shows a flowchart of an exemplary method in accordance with aspects of the present invention.
Figure 3B:
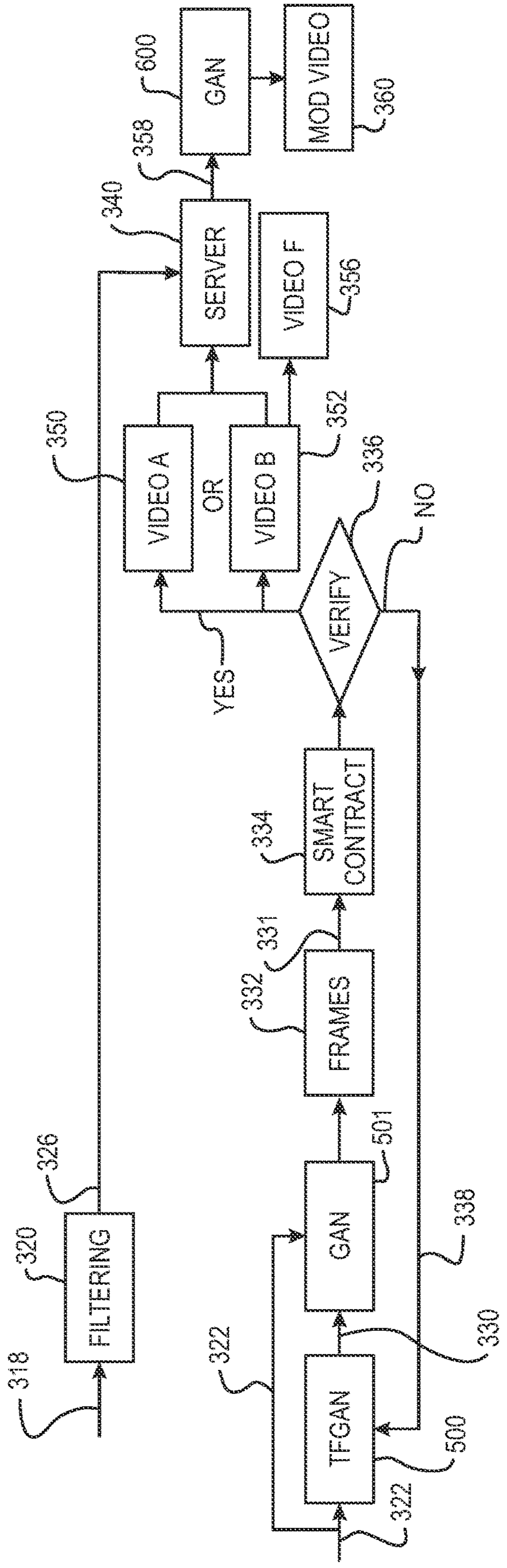
FIG. 3B shows a flowchart of an exemplary method in accordance with aspects of the present invention.

FIG. 3A and FIG. 3B show flowcharts of an exemplary method in accordance with aspects of the present invention. Steps of the method may be carried out in the environment of FIG. 2 and are described with reference to elements depicted in FIG. 2. In embodiments, system 300 may monitor or receive user data including first user data 302*a* and second user data 302*b*. First user data 302*a* and second user data 302*b* may be stored in a first historical user preference database 304*a* and a second historical user preference database 304*b* which may be combined into a user preference database 306. First user data 302*a* and second user data 302*b* may be used to generate keyword sets and keyword subsets via natural language processing (NLP) keyword generation 308*a* and 308*b*. Natural language processing keyword generation 308*a* and 308*b* may include receiving, preprocessing, and structuring of text input into a first set of keywords based on a user's stored preferences within the first historical user preference database 304*a* and a second historical user preference database 304*b*. In embodiments, the system may generate a first set of keywords based on a user's stored preferences including leveraging analytical cookies and tagged keywords to identify user preferences selected from a group consisting of brands, products, individuals, and entities reflecting the user's stored preferences. Natural language processing keyword generation 308*a* and 308*b* may augment the first set of keywords with a fixed set of ad provider-specific keywords for a fixed duration and prioritize the first set of keywords into a keyword cloud 312 including a first subset of keywords 310*a* corresponding to first user data 302*a* and a second subset of keywords 310*b* corresponding to second user data 302*b*. Natural language processing keyword generation 308*a* and 308*b* may augment the first set of keywords with a fixed set of ad provider-specific keywords for a fixed duration.

Figure 4:
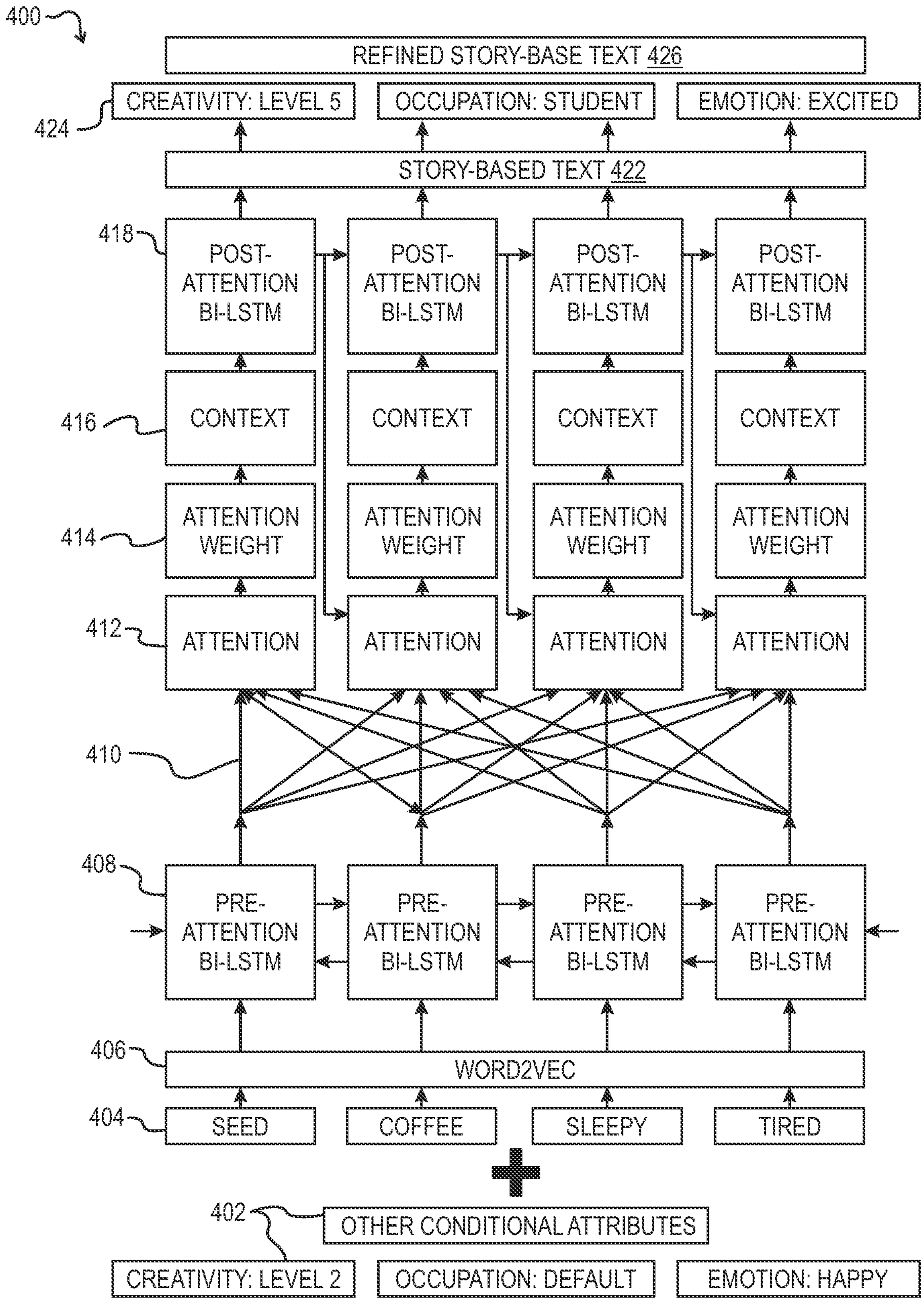
FIG. 4 shows a block diagram of an exemplary environment in accordance with aspects of the present invention.

Second subset of keywords 310*b* may be input into bi-LSTM 400 with an attention layer, as depicted in FIGS. 2 and 4, to generate a story-based text 322 specific to second user data 302*b*. In embodiments, generating a story-based text specific to user data may include inputting the at least one subset of keywords into the bi-directional attention-based long short-term memory recurrent neural network and inferring relationships between words within the at least one subset of keywords. In embodiments, generating a story-based text specific to user data may include conditioning the bi-directional attention-based long short-term memory recurrent neural network on factors selected from a group consisting of story length, word count, creativity level, or user emotion. First user data 302*a* may be compared to user preferences stored by the user preference database 306 or second user data 302*b* to determine a similarity score 316 between user preferences based on user-based collaborative filtering 320. As a non-limiting example, first user data 302*a* may have a relatively high similarity score 316 indicating a high overlap 318 in user preferences between first user data 302*a* and second user data 302*b*. As another non-limiting example, first user data 302*a* may have a relatively low similarity score 316 indicating low overlap 319 in user preferences between first user data 302*a* and second user data 302*b*. In this way, the system may determine a similarity score between the first set of keywords based on a user's stored preferences and a second set of keywords based on a second user's stored preferences; determine that the similarity score is above a predefined threshold; modify the video including the at least one generated video frame via an object replacement generative adversarial neural network; and generate a second video.

Figure 5:
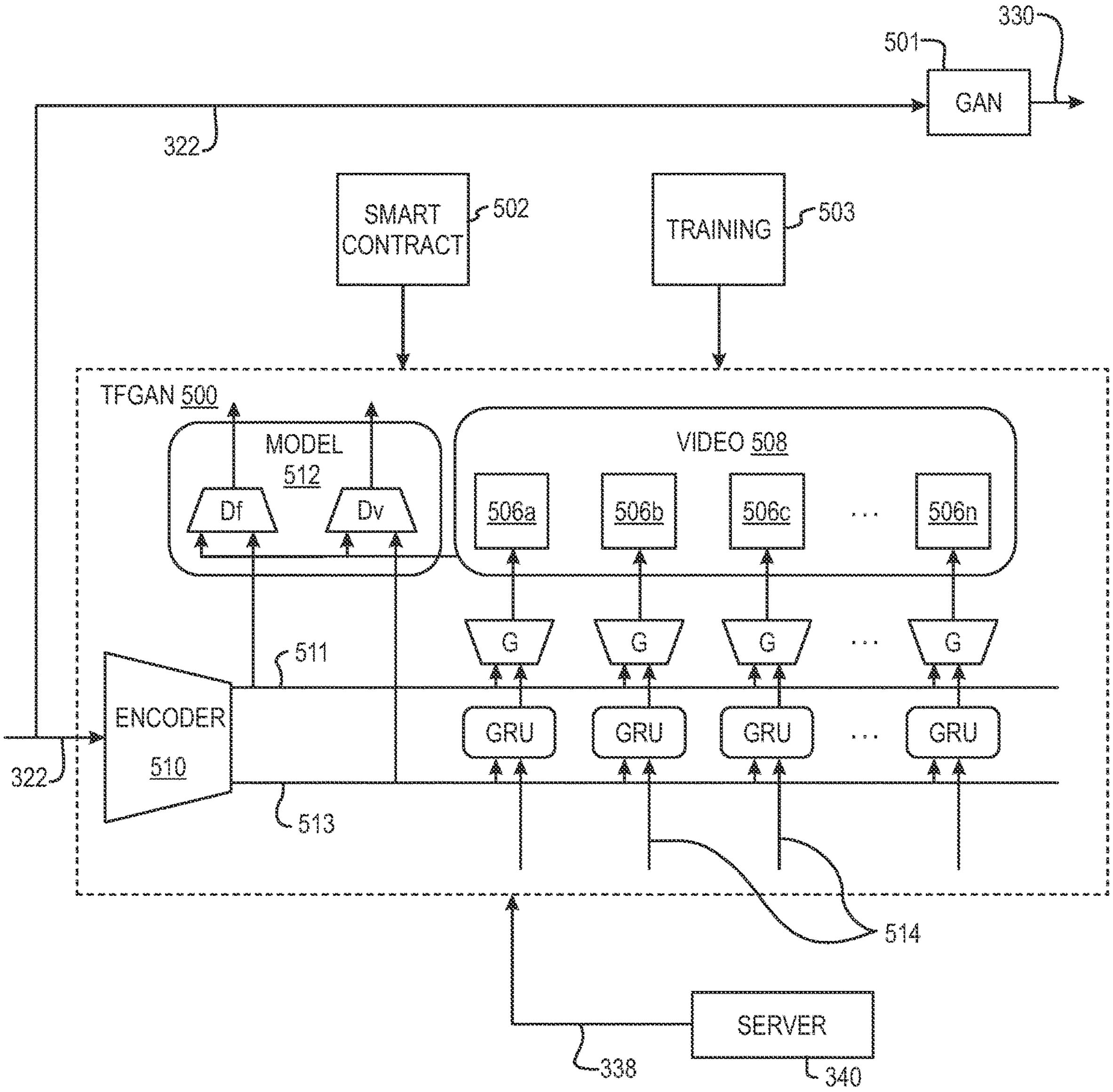
FIG. 5 shows a block diagram of an exemplary environment in accordance with aspects of the present invention.

Story-based text 322 may be input into TFGAN 500 or next-frame prediction GAN 501, depicted in FIG. 2 and FIG. 5, respectively. TFGAN 500 may generate a plurality of video frames 330 based on the story-based text 322 and may be trained on multiple text-to-video mapping database 504 as depicted in FIG. 5. TFGAN 500 may also be trained to regenerate frames not complying with smart contract mapping 502 as depicted in FIG. 5.

The plurality of video frames 330 may be input into next-frame prediction GAN 501 including a generator model and a discriminator model. Next-frame prediction GAN 501 may be a next-frame prediction module in operative cooperation with the video generative model (TFGAN 500). The generator model may be trained to generate new video frames and the discriminator model may be trained to classify the video frames generated by the generator model as either real or generated. The generator model and discriminator model may be trained in an adversarial manner against one another until the discriminator model is unable to consistently identify video frames that are real or generated. In this way, the next-frame prediction GAN 501 may be in operative cooperation with the video generative model (TFGAN 500) and may generate additional video frames 332 based on the plurality of video frames 330 to form a complete set of frames 331, as depicted in FIG. 3B.

With continued reference to FIG. 3B, the system may verify 336 compliance of single frames or the set of frames 331 with an embedded smart contract 334 relating to brands, products, individuals, and entities to protect intellectual property, brands, products, individuals, or entities. Verified frames may form various generated videos 350, 352 (Video A or Video B) depending on conditional attributes 402 of FIG. 4. Noncompliant frames 338 may be regenerated via TFGAN 500 until all frames within the complete set of frames 331 are verified 336 to create a final video 356 (Video F). This process may include verifying non-compliance of a generated video frame with an embedded smart contract having a generated object in non-compliance with the embedded smart contract and replacing the video frame including the generated object in non-compliance with the embedded smart contract with a second generated video frame including a generated object in compliance with the embedded smart contract.

Figure 6:
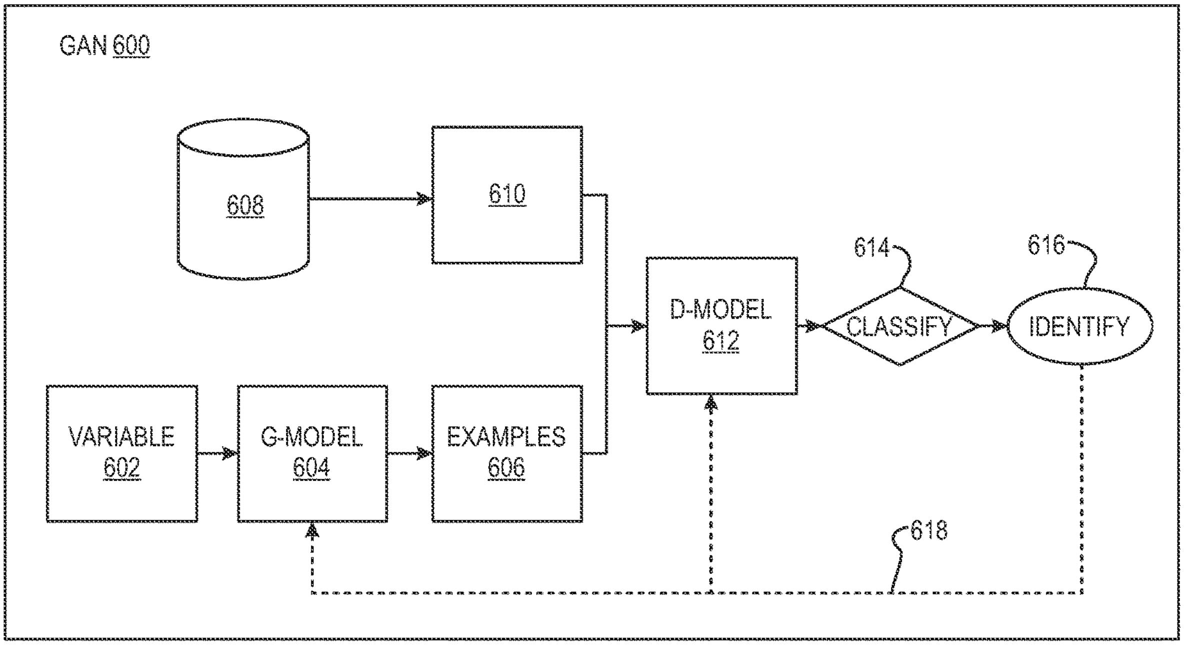
FIG. 6 shows a block diagram of an exemplary environment in accordance with aspects of the present invention.

Generated videos 350, 352 may be stored on a server 340, such as an edge server, until fetched or communicated 358 to an object replacement GAN 600, depicted in FIG. 6, and which is distinct from GAN 501. Object replacement GAN 600 may be configured to modify objects within frames of generated videos based on the similarity score 316 between user preferences based on user-based collaborative filtering 320. Where the system detects a relatively high similarity score 316 indicating high overlap 318 in user preferences between first user data 302*a* and second user data 302*b*, the system may search server 340 for an existing generated videos 350, 352 to be modified by object replacement GAN 600. As a non-limiting example, an existing generated ad may target users aged 20-30 years seeking premium coffee beverages from Brand "A." A second user aged 20-30 years seeking premium coffee beverages from Brand "B" may be served a generated ad that has been modified by the object replacement GAN 600 to replace Brand "A" with Brand "B" premium coffee beverages. In this way, the system may be configured to re-use generated ads as modified generated ads 360 via the object replacement GAN 600. In this way, verifying compliance of a generated video frame with an embedded smart contract includes verifying non-compliance of the generated video frame with an embedded smart contract; identifying the generated video frame including a generated object in non-compliance with the embedded smart contract; and replacing the generated video frame including a generated object in non-compliance with the embedded smart contract with a second generated video frame including a generated object in compliance with the embedded smart contract.

Referring to FIG. 4, bi-LSTM 400 with attention layer 412 may receive user preference data 404 and conditional attributes 402. The bi-LSTM 400 may produce fixed-length context vectors 406, i.e., WORD2VEC, from user preference data 404 used by a pre-attention bi-LSTM decoder 408 to generate an input sequence 410. The bi-LSTM 400 allows the model to take into account both the past and future context 416 of the input sequence 410. The bi-LSTM 400 utilizes two separate LSTM networks to read the input sequence 410 in forward order and another that reads it in reverse order. The outputs of both networks are concatenated to produce the final context vector. An attention module 412 computes a set of attention weights 414 for each time step of the input sequence 410. These weights indicate 414 how much attention the bi-LSTM 400 should pay to each time step when generating the output at the current time step. Attention weights 414 are learned during training and used to weight the input sequence based on its relevance to the current output time step. The post-attention bi-LSTM 418 may finalize the generation of story-based text 422, depicted as story-based text 322 in FIGS. 3A and 3B, based on the attention module 412, attention weight 414, and context 416. Refinement attributes 424 may be considered when generating refined story-based text 426 to produce a more tailored refined story-based text 426. As a non-limiting example, conditional attributes 402 may be received as user preferences or inferred from user preference history and may include, as examples, user ad preferences such as creativity level, occupational relevance, emotions, or the like.

Referring to FIG. 5, a plurality of video frames 506*a*, 506*b*, 506*c*, and 506*n* making up a generated video 508 may be generated via TFGAN 500 trained 503 on multiple text-to-video mapping databases and real-world videos. TFGAN 500 may be conditioned on story-based text 322 in addition to conditioning the TFGAN model based on contract mapping 522 from advertising agencies including information such as product names, brands, captions, or celebrities to be included in generated video frames such that a generated video is targeted to a particular entity, brand, or product. Story-based text 322 is passed to text encoder 510 to generate a frame-level representation 511 ($t$) and a video-level representation 513 ($vs$). Frame-level representation 511 is a representation common to all frames, and contains frame-level information like background, objects, etc. from the text. The video-level representation 513 extracts temporal information such as actions, object motion, and the like. The text representation along with a sequence of noise vectors 514 are passed to a recurrent neural network (such as a gated recurrent unit (GRU)) to produce a trajectory in the latent space. Sequences of latent vectors are then passed to a shared frame generator model G to produce the video sequence. The generated video is then fed to model 512 including two discriminator models—$D_F$ and $D_V$. $D_F$ is a frame-level discriminator that classifies if the individual frames in the video are real/fake, whereas the video discriminator $D_V$ is trained to classify the entire video as real/fake. The discriminator models $D_F$ and $D_V$ also take the text encoding frame-level representation 511 and a video-level representation 513 respectively as inputs so as to enforce text-conditioning. As previously described, non-compliant frames 338 may also be regenerated via TFGAN 500, in cooperation with object replacement GAN 600 as seen in FIG. 6, until all frames within the complete set of frames 331 are verified 336 to create a final ad 356.

Referring to FIG. 6, object replacement GAN 600 may be configured to modify objects within frames of generated videos based on the similarity score between user preferences based on user-based collaborative filtering. GAN 600 may be trained via two sub-models including a generator model 604 and a discriminator model 612. A generator model may be trained to generate new examples 606 based on latent random variables 602 and the discriminator model may be trained to classify 614 the examples 606 generated by the generator model and real examples 610 from the example database 608 as either real or generated. Discriminator model 612 may be trained until it is unable to consistently identify 616 examples that are real or generated so that the generator model 604 and a discriminator model 612 may receive fine-tune training 618. GAN models may be implemented as text-to-video models that receive natural language in the form of text as input and produce a video matching that description. Final ads may be stored on a server 340, such as an edge server, until fetched or communicated 358 to an object replacement GAN 600.

Where the system detects a relatively high similarity score 316, as depicted in FIG. 3, indicating high overlap 318 in user preferences between first user data 302*a* and second user data 302*b*, the system may search server 340 for an existing generated ad to be modified by object replacement GAN 600. In this way, the system may be configured to re-use generated ads as modified generated ads 360 via the object replacement GAN 600.

Figure 7:
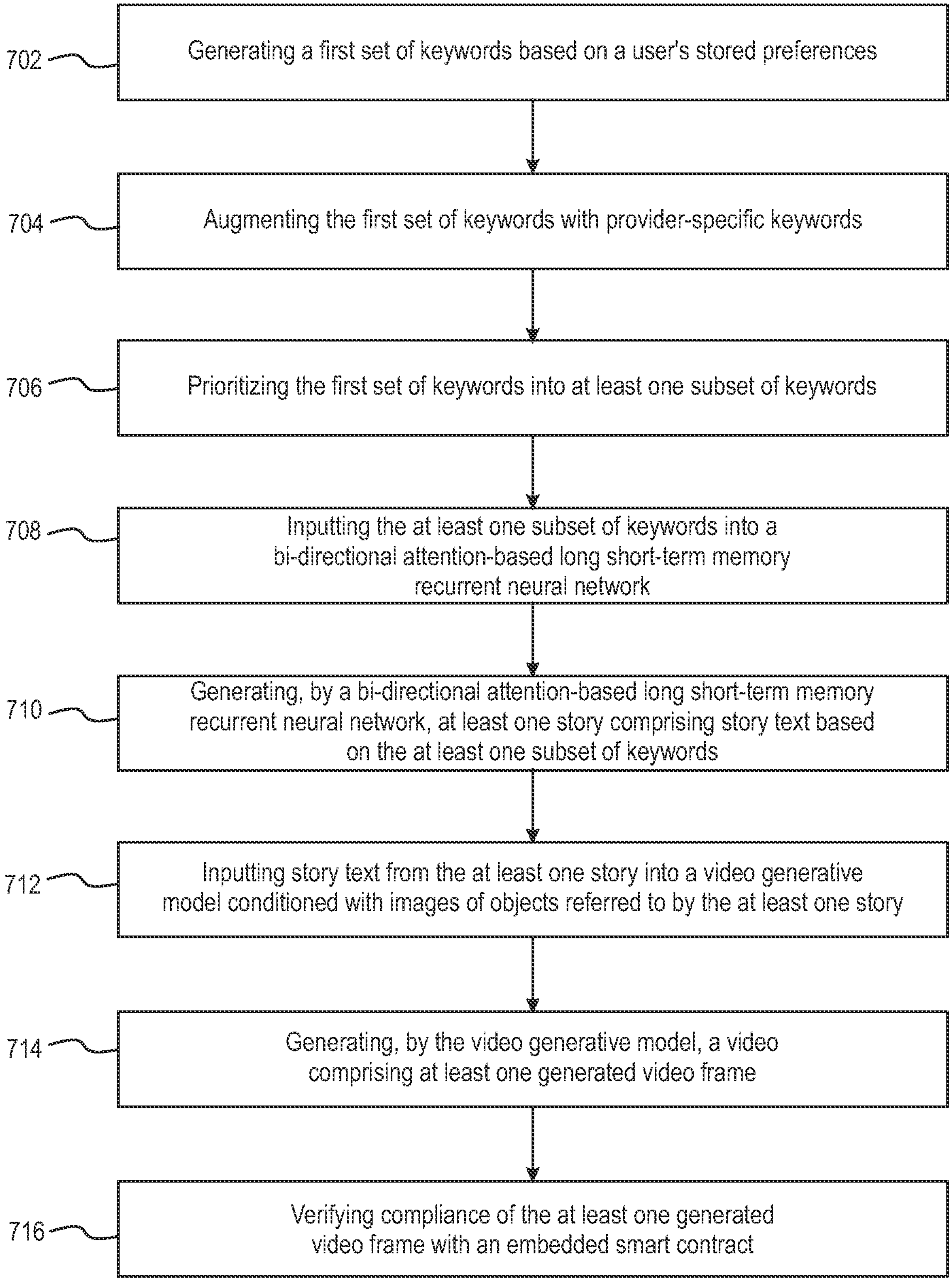
FIG. 7 shows a flowchart of an exemplary method in accordance with aspects of the present invention.

Referring to FIG. 7, a flowchart depicting an exemplary method in accordance with aspects of the present invention is shown. Steps of the method may be carried out in the environment of FIG. 2. At step 702, the system may generate a first set of keywords based on a user's stored preferences. At step 704, the system may augment the first set of keywords with provider-specific keywords. At step 706, the system may prioritize the first set of keywords into at least one subset of keywords. At step 708, the system may input the at least one subset of keywords into a bi-directional attention-based long short-term memory recurrent neural network. At step 710, the system may generate at least one story comprising story text based on the at least one subset of keywords via a bi-directional attention-based long short-term memory recurrent neural network. At step 712, the system may input story text from the at least one story into a video generative model conditioned with images of objects referred to by the at least one story. At step 714, the system may generate a video comprising at least one generated video frame via the video generative model. At step 716, the system may verify compliance of the at least one generated video frame with an embedded smart contract. In embodiments, the system may verify compliance of all video frames within the video with an embedded smart contract. In response to verifying compliance of the at least one generated video frame or video with an embedded smart contract, the video may be communicated to a server or device, or instructions to display the video may be communicated to a server or device.

In embodiments, a service provider could offer to perform the processes described herein. In this case, the service provider can create, maintain, deploy, support, etc., the computer infrastructure that performs the process steps in accordance with aspects of the invention for one or more customers. These customers may be, for example, any business that uses technology. In return, the service provider can receive payment from the customer(s) under a subscription and/or fee agreement and/or the service provider can receive payment from the sale of video content to one or more third parties.

In still additional embodiments, implementations provide a computer-implemented method, via a network. In this case, a computer infrastructure, such as computer 101 of FIG. 1, can be provided and one or more systems for performing the processes in accordance with aspects of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes in accordance with aspects of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
- generating, by a processor set, a first set of keywords based on a user's stored preferences;
- prioritizing, by the processor set, the first set of keywords into at least one subset of keywords;
- inputting, by the processor set, the at least one subset of keywords into a bi-directional attention-based long short-term memory recurrent neural network;
- generating, by the processor set using the bi-directional attention-based long short-term memory recurrent neural network, at least one story comprising story-based text generated by inferring relationship between words within a subset of keywords;
- inputting, by the processor set, the story-based text from the at least one story into a video generative model conditioned with images of objects referred to by the at least one story; and
- generating, by the processor set using the video generative model, a video comprising a plurality of generated video frames.

2. The computer-implemented method as in claim 1, further comprising verifying compliance of the plurality of generated video frames with an embedded smart contract.

3. The computer-implemented method as in claim 2, wherein verifying compliance of the plurality of generated video frames with the embedded smart contract comprises:
- verifying non-compliance of the plurality of generated video frames with the embedded smart contract;
- identifying at least one first generated video frame comprising a generated object in non-compliance with the embedded smart contract; and
- replacing the at least one first generated video frame comprising the generated object in non-compliance with the embedded smart contract with at least one second generated video frame comprising a generated object in compliance with the embedded smart contract.

4. The computer-implemented method as in claim 1, further comprising augmenting the first set of key words with provider-specific keywords selected from a group consisting of current events, featured products, and individuals.

5. The computer-implemented method as in claim 1, further comprising augmenting the first set of keywords with provider-specific keywords comprising augmenting the first set of keywords with a fixed set of provider-specific keywords for a fixed duration.

6. The computer-implemented method as in claim 1, wherein generating the at least one story-based text based on the at least one subset of keywords comprises:
- inputting the at least one subset of keywords into the bi-directional attention-based long short-term memory recurrent neural network.

7. The computer-implemented method as in claim 1, wherein generating the at least one story-based text on the at least one subset of keywords comprises conditioning the bi-directional attention-based long short-term memory recurrent neural network on factors selected from a group consisting of story length, word count, creativity level, or user emotion.

8. The computer-implemented method as in claim 1, wherein the video generative model comprises a time and frequency domain-based generative adversarial network.

9. The computer-implemented method as in claim 1, wherein generating video frames via the video generative model comprises generating video frames via a next-frame prediction GAN in operative cooperation with the video generative model.

10. The computer-implemented method as in claim 1, further comprising:
- determining a similarity score between the first set of keywords based on the user's stored preferences and a second set of keywords based on a second user's stored preferences;
- determining that the similarity score is above a predefined threshold;

modifying the video comprising the plurality of generated video frames via an object replacement generative adversarial neural network; and generating a second video.

11. A computer program product comprising one or more non-transitory computer readable storage media having program instructions collectively stored on the one or more non-transitory computer readable storage media, the program instructions executable to:

generate a first set of keywords based on a user's stored preferences;

prioritize the first set of keywords into at least one subset of keywords;

input the at least one subset of keywords into a bi-directional attention-based long short-term memory recurrent neural network;

generate at least one story comprising story-based text generated by inferring relationship between words within a subset of keywords via the bi-directional attention-based long short-term memory recurrent neural network;

input the story-based text from the at least one story into a video generative model conditioned with images of objects referred to by the at least one story; and generate a video comprising a plurality of generated video frames via the video generative model.

12. The computer program product as in claim 11, the program instructions executable to verify compliance of the plurality of generated video frames with an embedded smart contract.

13. The computer program product as in claim 12, wherein verifying compliance of the plurality of generated video frames with the embedded smart contract comprises:

verifying non-compliance of the plurality of generated video frames with the embedded smart contract;

identifying at least one first generated video frame comprising a generated object in non-compliance with the embedded smart contract; and replacing the at least one first generated video frame comprising the generated object in non-compliance with the embedded smart contract with at least one second generated video frame comprising a generated object in compliance with the embedded smart contract.

14. The computer program product as in claim 11, further comprising augmenting the first set of key words with provider-specific keywords selected from a group consisting of current events, featured products, and individuals.

15. The computer program product as in claim 11, further comprising augmenting the first set of keywords with provider-specific keywords comprising augmenting the first set of keywords with a fixed set of provider-specific keywords for a fixed duration.

16. The computer program product as in claim 11, wherein generating the at least one story-based text based on the at least one subset of keywords comprises:

inputting the at least one subset of keywords into the bi-directional attention-based long short-term memory recurrent neural network; and.

17. The computer program product as in claim 11, wherein generating the at least one story-based text on the at least one subset of keywords comprises conditioning the bi-directional attention-based long short-term memory recurrent neural network on factors selected from a group consisting of story length, word count, creativity level, or user emotion.

18. The computer program product as in claim 11, wherein the video generative model is a time and frequency domain-based generative adversarial network.

19. The computer program product as in claim 11, wherein generating video frames via the video generative model comprises generating video frames via a next-frame prediction GAN in operative cooperation with the video generative model.

20. A system comprising:

a processor set, one or more non-transitory computer readable storage media, and program instructions collectively stored on the one or more non-transitory computer readable storage media, the program instructions executable to:

generate a first set of keywords based on a user's stored preferences;

prioritize the first set of keywords into at least one subset of keywords;

input the at least one subset of keywords into a bi-directional attention-based long short-term memory recurrent neural network;

generate at least one story comprising story-based text generated by inferring relationship between words within a subset of keywords via the bi-directional attention-based long short-term memory recurrent neural network;

input the story-based text from the at least one story into a video generative model conditioned with images of objects referred to by the at least one story; and generate a video comprising a plurality of generated video frames via the video generative model.

* * * * *